Patented July 3, 1951

2,559,324

UNITED STATES PATENT OFFICE 2,559,324

TREATMENT OF SULFUR-CONTAINING MATERIALS

Paul Xavier Spillane, Ashfield, near Sydney, New South Wales, Australia, assignor to Keith Williams, Sydney, New South Wales, Australia No Drawing. Application November 16, 1948, Serial No. 60,378. In Australia April 12, 1946

9 Claims. (Cl. 23—177)

This application is a continuation-in-part of my copending application No. 738,491, now abandoned.

This invention relates to a process for converting sulphur compounds, present in gases, to sulphur and/or sulphur dioxide. By gases I mean not only those materials which are in the gaseous state at normal temperatures and pressures, but also those materials which are in the gaseous state at the temperature at which the process of this invention is carried out.

A process is described in my copending patent application, Ser. No. 53,988, filed October 11, 1948, for removing sulphur compounds from hydrocarbons and the like by treating them in the gaseous or vapour state with a desulphurising agent consisting of one or more alkali carbonates and catalytically active metallic iron at temperatures between 80° C. and 400° C. This process may be applied to the removal of sulphur compounds from gases or vapours other than hydrocarbons but, as in the case when the process is applied to hydrocarbons, the desulphurising agent finally becomes completely sulphur-fouled and must be replaced by a fresh batch. By completely sulphur-fouled is meant that the desulphurising agent has reached the stage, due to conversion of the alkali carbonate and catalytically active iron to sulphides, that it will no longer remove sulphur compounds from the gases or vapours under the said conditions.

I have now discovered that after this desulphurising agent has been sulphur-fouled by compounds of sulphur other than oxides of sulphur it may still be usefully employed to treat gases or vapours containing sulphur compounds, thereby eliminating waste of time and expense caused by the recharging step of the earlier process. Furthermore, the process of this invention enables one to obtain sulphur and/or sulphur dioxide direct from the sulphur compounds in the gases treated.

The sulphur-fouled desulphurising agent, hereinafter called the catalyst, of this invention operates in an entirely different manner than the unfouled agent. The sulphur compounds in the gases are, in the present process, converted either to elemental sulphur, sulphur dioxide, or both depending upon operating conditions, as will be apparent from the description hereafter. The said elemental sulphur and/or sulphur dioxide which is formed is carried through the chamber housing the catalyst and is included in the final effluent gases which, however, contain substantially none of the original sulphur compounds.

The catalyst, the sulphur-fouled desulphurising agent, appears to be selective in its action, and under certain conditions, which will be more fully described later, the effluent gas may require a second treatment with the same or further equivalent catalyst.

Accordingly, an object of this invention is to provide an effective, simple and inexpensve process for converting sulphur compounds to sulphur and/or sulphur dioxide.

It is a further object to provide a catalytic process for converting sulphur compounds to sulphur and/or sulphur dioxide such that the catalyst does not require to be replaced at frequent intervals.

The process, according to this invention, comprises passing gases containing sulphur compounds into contact with a catalyst at a temperature above 80° C. wherein the catalyst comprises a mixture of at least one alkali carbonate and catalytically active metallic iron which has been sulphur-fouled by compounds of sulphur other than oxides of sulphur.

The catalyst is prepared by forming an intimate admixture of at least one alkali carbonate and iron oxide, reducing the iron oxide to catalytically active metallic iron, for example by passing heated water gas over it, and then completely suphur-fouling it by passing gases containing sulphur compounds, other than oxides of sulphur, over the desulphurising agent at temperatures between 80° C. and 400° C. until the agent will no longer remove sulphur compounds from the said gases and becomes effective to convert them to sulphur and/or sulphur dioxide under suitable conditions. It may be necessary to pass the said gases into contact with the desulphurising agent for a time after the agent has ceased to remove the sulphur compounds from the gases before it becomes capable of converting sulphur compounds to sulphur and/or sulphur dioxide. For example, in a case where coke-oven gases were used to sulphur-foul the desulphurising agent, and were also subsequently treated with the fouled agent, a period of only a few minutes elapsed between the time when the desulphurising agent ceased to remove sulphur compounds from the coke-oven gases, and the time when it began to convert the sulphur compounds to sulphur and sulphur dioxide. In other tests using paper pulp digester gases the period was substantially longer and in one case amounted to nearly three hours.

It should be noted that a catalyst suitable for use in the present invention is not obtained if the desulphurising agent is fouled with sulphur dioxide—the sulphur-fouling must be carried out by sulphur compounds other than oxides of sulphur, such as inorganic and organic sulphides.

Oxygen, either as free oxygen or in the combined form as an oxide of carbon, must be present in the gases to be treated by the process of the invention. Of course, the gases to be treated may already contain sufficient oxygen to enable the catalytic conversion of the sulphur compounds to be effected but if this is not the case then sufficient oxygen, either as such or as carbon monoxide or carbon dioxide, must be added thereto. If the temperature of the catalyst, during preparation and/or use has not been allowed to exceed approximately 260° C. in the presence of oxygen, either as free oxygen or in the combined form as an oxide of carbon, then the sulphur compounds will be catalytically oxidised to elemental sulphur, and the effluent gases will contain elemental sulphur but will not contain sulphur dioxide. This is true, even when the proportion of oxygen is greatly in excess of the theoretic amount required to effect complete oxidation of the sulphur compounds to sulphur.

If, however, the temperature of the catalyst during preparation and/or use has been allowed to exceed approximately 260° C. in the presence of oxygen, as above defined, then, when the catalyst is used in the process of the present invention, the effluent gases will always contain some sulphur dioxide. This is true, even if the temperature of the catalyst is subsequently reduced to 80° C. (but the higher the temperature the greater is the proportion of sulphur dioxide produced), and even if the amount of oxygen present in the gases to be treated is not greater than the theoretic amount to give complete oxidation of the sulphur compounds to sulphur. In this last mentioned case a portion of the sulphur compounds is converted to sulphur, another portion is converted to sulphur dioxide, and the remainder passes through unchanged.

Accordingly, if it is desired to convert the sulphur compounds to sulphur dioxide, then it is essential that the catalyst temperature should at some time have exceeded approximately 260° C. in the presence of oxygen, and that there should be an excess of oxygen, either free or combined as an oxide of carbon, in the gases being treated. It is also desirable that the catalyst be operated at a fairly high temperature, for example 300° C. if the gases are not explosive in nature, but well below the ignition point of the gases if explosive in nature.

The description in the preceding three paragraphs applies where the sulphur compounds are other than oxides of sulphur. Where the sulphur compound in the gases to be treated is sulphur dioxide, then it can be converted to elemental sulphur by the catalyst of this invention by mixing the sulphur dioxide with a reducing gas, for example hydrogen, carbon monoxide, or water gas, before passing it into contact with the catalyst. The effluent gases in this case contain sulphur but substantially no sulphur dioxide. As stated previously, sulphur dioxide cannot be used to sulphur-foul the desulphurising agent to give the catalyst of this invention. In one particular experiment where the reducing gas was carbon monoxide the temperature in the catalyst chamber was allowed to rise to 750° C. and the process was still effective in converting the sulphur dioxide to elemental sulphur.

It has been found that if the gases to be treated are overall reducing in nature and contain no free oxygen, as, for example, coke-oven gases, the catalyst may exert a selective action in decomposing the sulphur compounds. Organic compounds of sulphur, such as thiophene, carbon oxysulphide, mercaptans and carbon disulphide (which may be regarded as organic sulphides) may not be decomposed by the fouled catalyst until the inorganic compounds of sulphur, particularly hydrogen sulphide, have been decomposed by the catalyst. In such cases the gases are first treated by the fouled catalyst whereby the hydrogen sulphide is converted to elemental sulphur, but the organic sulphur compounds may not have been decomposed, and the gases after the first treatment are then passed into contact with additional fouled catalyst to decompose the organic sulphur compounds to sulphur. Preferably the sulphur formed during the first treatment is removed from the gases before the second treatment. The sulphur-fouled catalyst used in the first treatment may be used in the second treatment if desired.

The following examples illustrate the application of the invention to gases which have been successfully treated by the present process.

Example 1

A desulphurising agent was prepared by dry mixing one part of sodium carbonate and 2 parts of ferric oxide by weight, mixing to a stiff paste with water, baking the paste, crushing and reducing the iron oxide to catalytically active metallic iron by passing blue water gas over the crushings. The temperature must be above approximately 210° C. before reduction will take place, and should be below 250° C. to prevent undesirable hydrogenation side reactions. The reduction treatment took approximately 6 hours. After from 3 to 5 hours, depending upon the moisture content of the mixture, the temperature rose suddenly, showing that catalytically active metallic iron was being formed. The throughput of water gas was then reduced so that the temperature was kept slightly below 250° C., and the reduction continued for another hour. The desulphurising agent produced consisted of a mixture of sodium carbonate and catalytically active metallic iron.

Gases having an approximate composition—

|  | Per cent |
|---|---|
| Hydrogen sulphide | 16–18 |
| Methyl mercaptan | 7–9 |
| Dimethyl sulphide | 3–5 |
| Oxygen | 18–22 |
| Carbon dioxide | 6–8 |
| Nitrogen | 50–38 | and produced during the digestion of wood with a solution containing sodium hydroxide and sodium sulphide at elevated temperature and pressure, and said gases having a sulphur content as high as 12,000 grains of sulphur per 100 cubic feet, were passed into contact with the desulphurising agent at a temperature of approximately 200° C. The gases after treatment were substantially free from sulphur and sulphur compounds. As the desulphurising agent fouled the temperature was increased to 400° C. After some time the desulphurising agent became completely sulphur-fouled and the gases after treatment contained the original sulphur compounds.

The temperature of the sulphur-fouled desulphurising agent was allowed to fall to 250° C. while continuing to pass the said gases into contact therewith. After a short time the gases after treatment were found to contain elemental sulphur and sulphur dioxide, but were substantially free from sulphur in any other form, showing that the catalyst of this invention had been formed. Thereafter the sulphur compounds present in the pulp digester gases were converted to sulphur and sulphur dioxide by the catalyst.

In preparing the initial desulphurising agent the sodium carbonate-iron oxide mix may be mixed into a paste by low-boiling solvents for the carbonate, such as lower aliphatic alcohols, instead of water. The sodium carbonate can be replaced by a mixture of alkali carbonates or bicarbonates if desired. The proportion of alkali carbonate may lie between 8% and 40% of alkali carbonate-iron oxide mixture, but preferably lies between 20% and 40%. A filler, such as diatomaceous earth, may be mixed with the alkali carbonate-iron oxide mix, preferably in amount equal by weight to approximately one-half of the weight of iron oxide. The reduction to catalytically active metallic iron may be carried out by hydrogen or carbon monoxide instead of water gas, and temperatures of up to approximately 300° C. if hydrogen, and up to approximately 295° C. if carbon monoxide, may then be used. The rise in temperature referred to in the case of water gas does not occur if hydrogen alone or carbon monoxide alone are used as the reducing agent.

Steam may be present in the gases to be treated, for example in the pulp mill digester gases, if desired.

*Example 2*

A gas having the following composition, namely—

| | Per cent |
|---|---|
| Oxygen | 10 |
| Carbon monoxide | 7 |
| Carbon dioxide | 6 |
| Hydrogen sulphide | 2.5 |
| Nitrogen | 74.5 | was passed through a catalyst chamber containing a catalyst according to this invention at a rate of approximately 6000 cubic feet per hour and a temperature of from 150° C. to 160° C. The whole of the hydrogen sulphide content of the gas was converted to elemental sulphur. The sulphur in the gas issuing from the catalyst chamber was recovered by liquid sulphur and/or water scrubbing. The space velocity employed varied from 1500 to 2000.

The desulphurising agent, that is the agent before being sulphur-fouled, was prepared as in the preceding example, except that the temperature of the agent was kept below 260° at all times. The desulphurising agent was prepared in a separate chamber and then loaded into the catalyst chamber. It was sulphur-fouled to produce the catalyst by passing the gas referred to in the preceding paragraph through the catalyst chamber. At first the gas issuing from the catalyst chamber was substantially free from sulphur in any form. However, the agent finally became sulphur-fouled, and for a space of about 15 minutes traces of hydrogen sulphide were noticed in the effluent gases. Thereafter the process proceeded as in the preceding paragraph.

*Example 3*

A desulphurising agent was prepared by dry mixing one part of sodium carbonate and two parts of bog iron ore, by weight, mixing to a stiff paste with water, baking the mixture, crushing the baked mixture, loading into a catalyst chamber, and passing a mixture of 50% carbon monoxide and 50% hydrogen over the agent for approximately 6 hours at a temperature of approximately 215° C. After about 5 hours the temperature rises suddenly, showing that catalytically active metallic iron is being formed, and the through-put of the carbon monoxide-hydrogen gas is reduced so that the temperature does not rise above 250° for the remaining hour of the reduction treatment. Substantially all the iron oxide is reduced to catalytically active metallic iron by this treatment.

This agent was then sulphur-fouled by passing a mixture of 80% carbon dioxide and 20% hydrogen sulphide over it at a space velocity of approximately 500 until the exit gases were found to contain appreciable quantities of hydrogen sulphide.

A gas consisting of 95% air and 5% hydrogen sulphide was then passed over the catalyst, the sulphur-fouled agent, and the exit gases were found to contain elemental sulphur and substantially no hydrogen sulphide.

It may be necessary when the gases are of an overall reducing nature, such as coke oven gas containing, inter alia, hydrogen sulphide, thiophene, mercaptans, carbon oxysulphide, and carbon disulphide and also containing carbon dioxide and carbon monoxide but substantially no free oxygen, to treat the gases in two steps, in the first of which the catalyst decomposes the inorganic sulphur compounds, and in the second step decomposes the organic sulphur compounds.

An alternative method of producing the desulphurising agent diluted with a filler is as follows. Ferric nitrate in sufficient amount to give two parts of ferric oxide by weight is heated to melting temperature and mixed with sufficient diatomaceous earth to give a stiff paste. Approximately one part of diatomaceous earth is required. The paste is then heated to about 300° C. to decompose the ferric nitrate to ferric oxide. The dried paste is then immersed in a strong solution of sodium carbonate, removed from the solution, baked at about 300° C. and then granulated to pellets of the required size. The pellets are then charged into a catalyst chamber and treated with hydrogen or other reducing gas to reduce substantially all the iron oxide to catalytically active metallic iron.

The strength of the sodium carbonate solution is adjusted by trial until analysis of the baked sodium carbonate-iron oxide-diatomaceous earth mixture shows the required proportion of sodium carbonate.

The desulphurising agent, as previously must then be sulphur-fouled by compounds of sulphur other than oxides of sulphur by passing the said compounds in the vapour state over the desulphurising agent.

When both elemental sulphur and sulphur dioxide are obtained they may be separated from the effluent gases by cooling to condense the sulphur, and the sulphur dioxide absorbed, as for instance in lime water or other solvent, or it may be liquefied, and the remaining sulphur-free gases thereby obtained separately.

Without limitation of this invention, the catalyst, the sulphur-fouled desulphurising agent, employed in the process of this invention is believed to comprise iron sulphide (FeS), iron disulphide (Fe₂S₃) and sodium sulphite and/or sodium sulphide. When the conditions are of a reducing nature sodium sulphide rather than sodium sulphite is present, whereas when the conditions are of an oxidising nature sodium sulphite rather than sodium sulphide is present.

It has been found necessary, when cyanide compounds are present in the gases to be treated, to remove same from the gases before subjecting them to the process of this invention.

The temperature employed for the process of this invention should be below 250° C. or above 400° C. if any substantial amounts of elemental sulphur are formed during the process. Below approximately 250° C. the elemental sulphur comes away with the effluent gases, and above approximately 400° C. it is vaporised. Between approximately 250° C. and 400° C. however, part of the sulphur formed in the process may tend to collect in the catalyst chamber, particularly in any dead pockets, melt, and clog the catalyst. If it is desired to convert sulphur dioxide to sulphur by the process of this invention it is necessary to use temperatures above 250° C. before decomposition of the sulphur dioxide occurs. To avoid sulphur clogging the catalyst it is therefore necessary to employ temperatures above 400° C. in such a case, a temperature of 450° being suitable.

The process of this invention may be operated as a two stage process. During the first stage the desulphurising agent acts to remove sulphur compounds from gases containing them. After a time the desulphurising agent becomes completely sulphur-fouled, and ceases to remove the sulphur compounds from the said gases. In the second stage of the process the same, or other, gases containing sulphur compounds are passed into contact with the sulphur-fouled desulphurising agent and substantially all the sulphur compounds are converted into sulphur and/or sulphur dioxide, according to the conditions of operation, as previously described. The sulphur and/or sulphur dioxide appear in the effluent gases coming from the sulphur-fouled desulphurising agent during the second stage of the process. During the first stage of the process the gases or vapours must contain sulphur compounds other than oxides of sulphur. In the second stage of the process, if the sulphur compounds are other than oxides of sulphur, the gases or vapours must contain oxygen, carbon dioxide or carbon monoxide. If the sulphur compound in the gases or vapours is sulphur dioxide then the gases or vapours must contain a reducing gas such as hydrogen, carbon monoxide or mixtures of hydrogen and carbon monoxide such as water gas.

I claim:

1. A catalyst comprising a mixture of at least one alkali carbonate and catalytically active metallic iron prepared by passing a reducing gas selected from the class consisting of hydrogen, carbon monoxide and water gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature between 80° C. and 400° C., said catalyst being an active agent at temperatures above 80° C. for the catalytic oxidation of gaseous sulphides to elemental sulphur when the catalyst is at no time heated to a temperature exceeding 260° C. and to a mixture of sulphur and sulphur dioxide when the catalyst is at at any time heated to a temperature exceeding 260° C.

2. A catalyst comprising a mixture of at least one alkali carbonate and catalytically active metallic iron prepared by passing a reducing gas selected from the class consisting of hydrogen, carbon monoxide and water gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature not in excess of 260° C., said catalyst being an active agent at temperatures above 80° C. and up to 260° C. for the catalytic oxidation of gaseous sulphides to elemental sulphur.

3. A catalyst comprising a mixture of at least one alkali carbonate and catalytically active metallic iron prepared by passing a reducing gas selected from the class consisting of hydrogen, carbon monoxide and water gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature in excess of 260° C., said catalyst being an active agent at temperatures above 80° C. for the catalytic oxidation of gaseous sulphides to a mixture of elemental sulphur and sulphur dioxide.

4. A catalyst comprising a mixture of sodium carbonate and catalytically active metallic iron prepared by passing a reducing gas selected from the class consisting of hydrogen, carbon monoxide and water gas over an intimate admixture of sodium carbonate and an iron oxide in the absence of sulphur, said last-named admixture containing 8% to 40% of sodium carbonate, whereby the iron oxide is converted into catalytically active metallic form, and then completely sulphur-fouling the resultant reduced admixture by passing gaseous compounds of sulphur into contact therewith other than oxides of sulphur at a temperature between 80° C. and 400° C., said catalyst being an active agent at temperatures above 80° C. for the catalytic oxidation of gaseous sulphides to elemental sulphur when the catalyst is at no time heated to a temperature exceeding 260° C. and to a mixture of sulphur and sulphur dioxide when the catalyst is at any time heated to a temperature exceeding 260° C.

5. A process for converting sulphur compounds, other than oxides of sulphur, to a member of the group consisting of elemental sulphur and a mixture of the latter with sulphur dioxide, which comprises passing the sulphur compounds in the gaseous state, and in admixture with a gas selected from the group consisting of oxygen, carbon monoxide and carbon dioxide, into contact with a catalyst at a temperature above 80° C., said catalyst comprising a mixture of at least one alkali carbonate and catalytically active metallic iron prepared by passing a reducing gas selected from the class consisting of hydrogen, carbon monoxide and water gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature between 80° C. and 400° C., said catalyst being an active agent at temperatures above 80° C. for the catalytic oxidation of gaseous sulphides to elemental sulphur when the catalyst is at no time heated to a temperature exceeding 260° C. and to a mixture of sulphur and sulphur dioxide when the catalyst is at any time heated to a temperature exceeding 260° C.

6. A process for converting gaseous sulphides into elemental sulphur, which comprises passing the said sulphides in admixture with a gas selected from the group consisting of oxygen, carbon monoxide and carbon dioxide, into contact with a catalyst at a temperature above 80° C. and below 260° C., said catalyst comprising a mixture of at least one alkali carbonate and catalytically active metallic iron prepared by passing a reducing gas selected from the class consisting of hydrogen, carbon monoxide and water gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature not in excess of 260° C., said catalyst being an active agent at temperatures above 80° C. and up to 260° C. for the catalytic oxidation of gaseous sulphides to elemental sulphur.

7. A process for converting gaseous sulphides into a mixture of elemental sulphur and sulphur dioxide, which comprises passing the said sulphides in admixture with a gas selected from the group consisting oxygen, carbon monoxide and carbon dioxide, into contact with a catalyst at a temperature above 80° C., said catalyst comprising a mixture of at least one alkali carbonate and catalytically active metallic iron prepared by passing a reducing gas selected from the gas over an intimate admixture of at least one alkali carbonate and an iron oxide in the absence of sulphur, said last-named admixture containing 8% to 40% of alkali carbonate, whereby the iron oxide is converted into catalytically active metallic form, and then completely sulphur-fouling the resultant reduced admixture by passing gaseous compounds of sulphur other than oxides of sulphur into contact therewith at a temperature in excess of 260° C., said catalyst being an active agent at temperatures above 80° C. for the catalytic oxidation of gaseous sulphides to a mixture of elemental sulphur and sulphur dioxide.

8. A process for converting sulphur compounds, other than oxides of sulphur, to a member of the group consisting of elemental sulphur and a mixture of the latter with sulphur dioxide, which comprises passing the sulphur compounds in the gaseous state, and in admixture with a gas selected from the group consisting of oxygen, carbon monoxide and carbon dioxide, into contact with a catalyst at a temperature above 80° C., said catalyst comprising a mixture of sodium carbonate and catalytically active metallic iron prepared by passing a reducing gas selected from the class consisting of hydrogen, carbon monoxide and water gas over an intimate admixture of sodium carbonate and an iron oxide in the absence of sulphur, said last-named admixture containing 8% to 40% of sodium carbonate, whereby the iron oxide is converted into catalytically active metallic form, and then completely sulphur-fouling the resultant reduced admixture by passing gaseous compounds of sulphur into contact therewith other than oxides of sulphur at a temperature between 80° C. and 400° C., said catalyst being an active agent at temperatures above 80° C. for the catalytic oxidation of gaseous sulphides to elemental sulphur when the catalyst is at no time heated to a temperature exceeding 260° C. and to a mixture of sulphur and sulphur dioxide when the catalyst is at any time heated to a temperature exceeding 260° C.

9. A process for treating gases containing sulphides which comprises passing said gases in a first stage into contact with a desulphurizing agent at temperatures between 80° C. and 400° C., said desulphurizing agent comprising a mixture of at least one alkali carbonate and catalytically active metallic iron, until the desulphurizing agent will no longer absorb the said sulphides, said mixture having been prepared by passing a reducing gas selected from the class consisting of hydrogen, carbon monoxide and water gas over an intimate admixture of at least one alkali carbonate and an iron oxide in the absence of sulphur, said mixture containing 8% to 40% of alkali carbonate, and in a second stage passing further gases containing sulphides and a gas selected from the group consisting of oxygen, carbon monoxide and carbon dioxide into contact with the completely fouled agent resulting from the first stage at temperatures above 80° C.

PAUL XAVIER SPILLANE.

REFERENCES CITED

The following references are of record in the file of this patent:

UNITED STATES PATENTS

| Number | Name | Date |
| --- | --- | --- |
| 2,110,241 | Roelen | Mar. 8, 1938 |
| 2,316,201 | Wallden et al. | Apr. 13, 1943 |
| 2,402,684 | Signaigo | June 25, 1946 |
| 2,497,176 | Mason | Feb. 14, 1950 |
| 2,511,453 | Barry | June 13, 1950 |